No. 798,195. PATENTED AUG. 29, 1905.
A. J. LOCHER & J. A. PREDOM.
PNEUMATIC TIRE PROTECTOR.
APPLICATION FILED MAR. 2, 1905.

Witnesses:
Chas. F. Bassett.
H. Benjamin.

Inventors
J. A. Predom
A. J. Locher
By Frederick Benjamin
Atty.

UNITED STATES PATENT OFFICE.

ALBERT J. LOCHER AND JOHN A. PREDOM, OF AUBURN, CALIFORNIA.

PNEUMATIC-TIRE PROTECTOR.

No. 798,195.　　　Specification of Letters Patent.　　　Patented Aug. 29, 1905.

Application filed March 2, 1905. Serial No. 248,009.

*To all whom it may concern:*

Be it known that we, ALBERT J. LOCHER and JOHN A. PREDOM, citizens of the United States, residing at Auburn, in the county of Placer and State of California, have invented certain new and useful Improvements in Pneumatic-Tire Protectors, of which the following is a specification.

Our invention relates to improvements in protectors for cushion or pneumatic tires such as are commonly used on automobiles; and the invention consists in an armor to be applied to the tread-surface of the tire and adapted to protect the latter from puncture or wear by contact with the road.

One object of our invention is to provide an armor that will not injure the tire by contact therewith and that will prevent the skidding or sliding of the wheels on smooth or wet pavements.

A further object is to provide a tire wearing or tread surface that will stiffen the pneumatic tire without materially affecting its resilience and that can be renewed without great expense.

Having the aforegoing special objects in view and others of general utility, we have designed the tire-protector shown in a preferred form in the accompanying drawings, in which—

Figure 1:
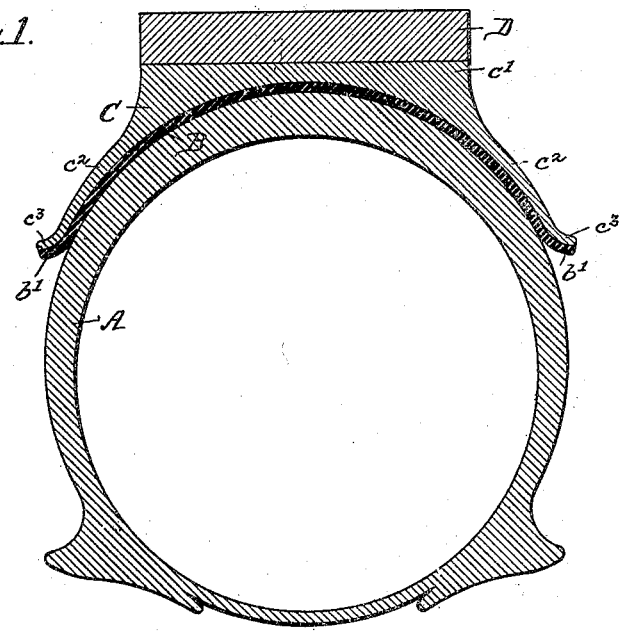
Figure 2:
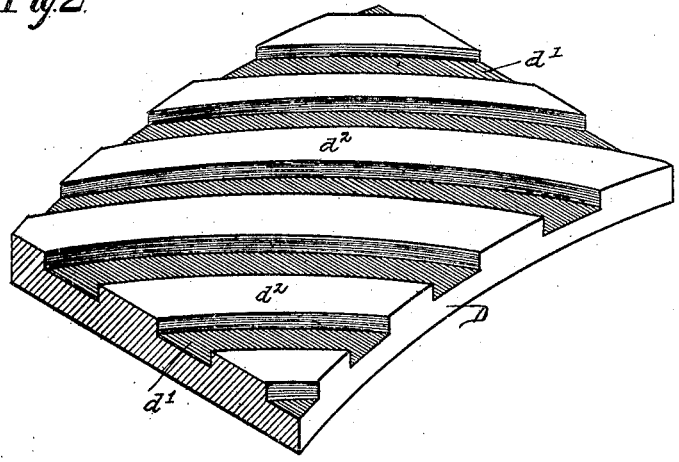

Figure 1 is a cross-sectional view of a pneumatic tire of well-known form equipped with our improved protector; and Fig. 2 is a perspective view of a section of our protector, showing the tread or wearing surface.

Referring to the drawings in detail, A represents a common form of pneumatic tire as it would appear in cross-section; but it will be understood that our protector is applicable to any form of rubber cushion-tire whether inflatable or not.

B represents a cover for the tread-surface of the tire proper, and same is made from fiber, vulcanized rubber, or other suitable material adapted to be fitted closely to the surface of the tire and to be formed in an endless band having outwardly-curved edges, as $b'$, which present a convex face to the adjacent portion of the tire. Placed over the band B is the armor proper, C, which consists of an annular spring-steel band formed with a central thickened portion $c'$ and on each side with a curved flange $c^2$, which conforms to the contour of the band B and has its edges $c^3$ curved outwardly, so as to cover and protect the corresponding edges $b'$ of the band B. This steel armor has its ends welded together and ground down to form a smooth joint, so that it will present unbroken surfaces both to the band, which it covers, and the subtire D, which it supports on its outer and flat face $c^4$.

The subtire D is an annular band or ring of steel or any suitable metal which is placed over the armor C and may be secured thereto in any approved manner. It may be formed with a smooth wearing-surface or transversely barred with grooves and ridges, as $d'$ $d^2$, the latter being preferably for use on smooth or slippery streets or in climbing hills.

From the construction above described it will be seen that we have provided a protector made up of three elements so combined and formed as to obtain the results sought for. The band B, of semiflexible material, serves to protect the rubber from direct contact with the hard metal of the armor-ring C, and the latter is in turn protected by the tire D from direct contact with the road, this last function being important in view of the cost of such ring. We have not shown any method of connecting the tire D to the armor C, because such connection may be effected in any of the ways known in the art and forms no part of our invention. The outwardly-curved edges of the cover B and armor C serve to protect the rubber tire from injury when the latter is under compression, as will be readily apparent.

Having thus described our invention, what we claim, and desire to obtain by Letters Patent, is—

1. A protector for cushion-tires, consisting of a band of semiflexible material substantially as described fitted to the tread-surface of the tire and formed with outwardly-curved side edges, an armor adapted to cover said band and composed of metal having spring-flanges and outwardly-curved side edges, and a metal band fitted to said armor and adapted to form the tread-surface of the protector.

2. A protector for cushion-tires, consisting of a band of semiflexible material substantially as described, covering the tread-surface of the tire and formed with outwardly-flaring side edges, an armor adapted to cover said band and composed of spring metal formed with a flat central portion and with flanges having their edges flaring outwardly and a
5 metal ring secured to the central portion of the armor and adapted to form an antislipping tread-surface for the protector.

In testimony whereof we affix our signatures in presence of two witnesses.

ALBERT J. LOCHER.
   JOHN A. PREDOM.

Witnesses:
 L. L. CHAMBERLAIN,
 J. E. MARKS.